US006593738B2

(12) United States Patent
Kesil et al.

(10) Patent No.: US 6,593,738 B2
(45) Date of Patent: Jul. 15, 2003

(54) METHOD AND APPARATUS FOR MEASURING THICKNESS OF CONDUCTIVE FILMS WITH THE USE OF INDUCTIVE AND CAPACITIVE SENSORS

(76) Inventors: Boris Kesil, 5141 Ishimatsu Pl., San Jose, CA (US) 95124; David Margulis, 4754 Campbell Ave., Apt. #23, Campbell, CA (US) 95130; Elik Gershenzon, 1551 Southgate Ave., Apt. #327, Daly City, CA (US) 94015

( * ) Notice: Subject to any disclaimer, the term of this patent is extended or adjusted under 35 U.S.C. 154(b) by 0 days.

(21) Appl. No.: 09/954,550

(22) Filed: Sep. 17, 2001

(65) Prior Publication Data

US 2003/0090266 A1 May 15, 2003

(51) Int. Cl.$^7$ .......................... G01B 7/10; G01R 33/12; G01N 27/72
(52) U.S. Cl. ........................................ 324/230; 324/226
(58) Field of Search ................................ 324/229, 230, 324/231, 227, 226

(56) References Cited

U.S. PATENT DOCUMENTS

| 4,849,694 A | * | 7/1989 | Coates ........................ 324/230 |
| 5,781,008 A | | 7/1998 | Muller et al. |
| 6,072,313 A | | 6/2000 | Li et al. |

OTHER PUBLICATIONS

I. Herman "Optical Diagnostics for Thin Film Processing," Academic Press, 1996, Chapter 9.
D. Schroder "Semiconductor Meterial and Device characterization", John Willy & Sons, Inc., N.Y. 1990, pp. 2–40.

* cited by examiner

Primary Examiner—Walter E. Snow (57) ABSTRACT

The invention relates to an apparatus for measuring thickness and deviations from the thickness of thin conductive coatings on various substrates, e.g., metal coating films in semiconductor wafer or hard drive disks. The thickness films may be as small as fractions of microns. The apparatus consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer, which is rigidly connected to the inductive sensor. According to another embodiment, the distance is controlled with the use of a capacitance sensor, which is also rigidly connected to the inductive sensor.

14 Claims, 9 Drawing Sheets

METHOD AND APPARATUS FOR MEASURING THICKNESS OF CONDUCTIVE FILMS WITH THE USE OF INDUCTIVE AND CAPACITIVE SENSORS

FIELD OF THE INVENTION

The present invention relates to the field of measurement of film thickness, more specifically, to measuring thickness of conductive coatings on various conductive substrates or on non-conductive substrates with electric properties different from those of the coating films. In particular, the invention may find use in measuring thickness of coating films on semiconductor wafers, hard drive disks, or the like.

BACKGROUND OF THE INVENTION

There exists a great variety of methods and apparatuses used in the industry for measuring thickness of coating films and layers applied or laid onto substrates. These methods and apparatuses can be classified in accordance with different criteria. Classification of one type divides these methods into direct and indirect.

An example of a direct method is measurement of a thickness in thin metal coating films by means of so-called X-ray reflectivity. One of these methods is based on a principle that X-rays and gamma-rays are absorbed by matter. When a beam of rays passes through a material, the amount of the beam absorbed depends on what elements the material consists of, and how much of the material the beam has to pass through. This phenomenon is used to measure the thickness or density of a material. The advantage of measuring in this way is that the gauge does not have to touch the material it is measuring. In other words, in thickness measurement, the surface of a web or strip product will not be scratched. The instrument for this method is e.g., RMS1000 Radiometric System produced by Staplethorne Ltd (UK). The instrument uses a suitable radiation source and one or more radiation detectors installed in a mechanical housing which also provides high quality radiological shielding. The source may be an X-ray tube or a radioactive source. The instrument also uses a set of beam defining collimators and one or more radiation detectors. The detectors measure the radiation absorbed within the object or flow being measured and output the signal data to a computer. For thickness gauging, the collimators usually define a single, narrow beam. This gives optimum spatial resolution.

A disadvantage of radiation methods is the use of X-ray or gamma radiation that requires special safety measures for protection of the users against the radiation. The instruments of this type are the most expensive as compared to metrological equipment of other systems.

Another example of direct measurement is a method of optical interferometry, described e.g., by I. Herman in "Optical Diagnostics for Thin Film Processing", Academic Press, 1996, Chapter 9. Although the optical interferometry method produces the most accurate results in measuring the thickness of a coating film, it has a limitation. More specifically, for conductive films, to which the present invention pertains, this method is limited to measurement of extremely thin coating films which are thin to the extent that a nontransparent material, such as metal, functions as transparent. In other words, this method is unsuitable or is difficult to use for measuring conductive films thicker than 200 Å to 500 Å.

Another example of direct measurement methods is measuring thickness of a film in situ in the course of its formation, e.g., in sputtering, magnetron target sputtering, CVD, PVD, etc. These methods, which are also described in the aforementioned book of I. Herman, may involve the use of the aforementioned optical interferometry or ellipsometry. However, in this case measurement is carried out with reference to both the surface of the substrate and the surface of the growing layer. Therefore, this method is inapplicable to measuring thickness of the film that has been already deposited.

In view of the problems associated with direct methods, indirect non-destructive methods are more popular for measuring thickness of ready-made films. An example of a well-known non-destructive indirect method used for measuring thickness of a film is the so-called "four-point probe method". This method is based on the use of four contacts, which are brought into physical contact with the surface of the film being measured. As a rule, all four contacts are equally spaced and arranged in line, although this is not a compulsory requirement. Detailed description of the four-point probe method can be found in "Semiconductor Material and Device Characterization" John Wiley & Sons, Inc., N.Y., 1990, pp. 2–40, by D. Schroder. The same book describes how to interpret the results of measurements. This method is classified as indirect because the results of measurement are indirectly related to the thickness of the film. It is understood that each measurement of electric characteristics has to correlated with the actual thickness of the film in each particular measurement, e.g., by cutting a sample from the object and measuring the thickness of the film in a cross-section of the sample, e.g., with the use of an optical or electron microscope. Nevertheless, in view of its simplicity, low cost, and convenience of handling, the four-point probe method is the most popular in the semiconductor industry.

However, the four-point method has some disadvantages. The main problem associated with the aforementioned four-point probe method consists in that in each measurement it is required to ensure reliable contact in each measurement point. This is difficult to achieve since conditions of contact vary from sample to sample as well as between the four pointed contact elements of the probe itself in repeated measurement with the same probe. Such non-uniformity affects the results of measurements and makes it impossible to perform precision calibration.

Known in the art are also methods for measuring film thickness with the use of an inductive sensors. For example, U.S. Pat. No. 6,072,313 issued in 2000 to L. Li et al. describes in-situ monitoring and control of conductive films by detecting changes in induced eddy currents. More specifically, the change in thickness of a film on an underlying body such as a semiconductor substrate is monitored in situ by inducing a current in the film, and as the thickness of the film changes (either increase or decrease), the changes in the current are detected. With a conductive film, eddy currents are induced in the film by generating an alternating electromagnetic field with a sensor, which includes a capacitor and an inductor. The main idea of the apparatus of U.S. Pat. No. 6,072,313 consists in using a resistor and a capacitor in a parallel resonance circuit. The resonance is caused by means of an oscillator. The inductive coupling between the oscillation circuit and the Eddy current inducted in the coating is used for improving a signal/noise ratio and can be used for improving quality of measurements. In fact, this is a method well known in the radioelectronics for measuring under conditions of the electrical resonance. The above patent describes the aforementioned inductive method for measuring thickness of a film in chemical mechanical polishing (CMP).

A similar inductive method, which was used for measuring thickness of a slag, is disclosed in U.S. Pat. No. 5,781,008 issued in 1998 to J. Muller et al. The invention relates to an apparatus for measuring the thickness of a slag layer on a metal melt in a metallurgical vessel. The apparatus comprises a first inductive eddy current sensor which indicates the distance of the apparatus from the metal melt as it is moved toward the melt. A second sensor detects when the apparatus reaches a predetermined distance relative to or contacts the slag layer and triggers the inductive eddy-current sensor when such distance is attained. The sensors are arranged in a predetermined spatial relation, and the thickness of the slag layer is determined by an evaluation device, which analyzes the received signals. The apparatus permits measurement of the thickness of the slag layer without the need of additional equipment (e.g. mechanical lance movement or distance measurement).

The method and apparatus of U.S. Pat. No. 5,781,008 relate to macro-measurements of thick layers, and the sensors used in the apparatus of this invention are inapplicable of measuring thickness of thin-film coatings on such objects as semiconductor wafers and hard-drive disks. Furthermore, once the second sensor has detected that the apparatus reached a predetermined distance relative to or contacts the slag layer, this distance remains unchanged during the measurement procedure. This condition is unacceptable for measuring thickness of a thin film with microscopic thickness which moves relative to the sensor, e.g., for mapping, i.e., for determining deviations of the thickness over the substrate.

In order to understand why the use of known eddy-current sensor systems utilizing a measurement eddy-current sensor and a proximity sensor cannot be easily and directly applicable to measurement of microscopically-thin film coatings on conductive or non-conductive substrates, let us consider constructions and operations of the aforementioned known systems in more detail.

Generally speaking, all inductive sensors are based on the principle that in its simplest form an inductive sensor comprises a conductive coil which is located in close proximity to a conductive film to be measured and in which an electric current is induced. The conductive film can be considered as a short-circuited virtual coil turn with a predetermined electrical resistance. Since a mutual inductance exists between the aforementioned conductive coil and the virtual coil turn, an electric current is generated in the virtual coil turn. This current is known as eddy current or Foucault current. Resistance of the virtual coil turn, which depends on the material of the conductive film and, naturally, on its thickness, influences the amplitude of the alternating current induced in the virtual turn. It is understood that the amplitude of the aforementioned current will depend also on the thickness of the conductive film.

However, realization of a method and apparatus based on the above principle in application to thin films is not obvious. This is because such realization would involve a number of important variable parameters which depend on a specific mode of realization and which are interrelated so that their relationships not always can be realized in a practical device.

In order to substantiate the above statement, let us consider the construction of an inductive sensor of the aforementioned type in more detail.

Figures 1, 2, 3:
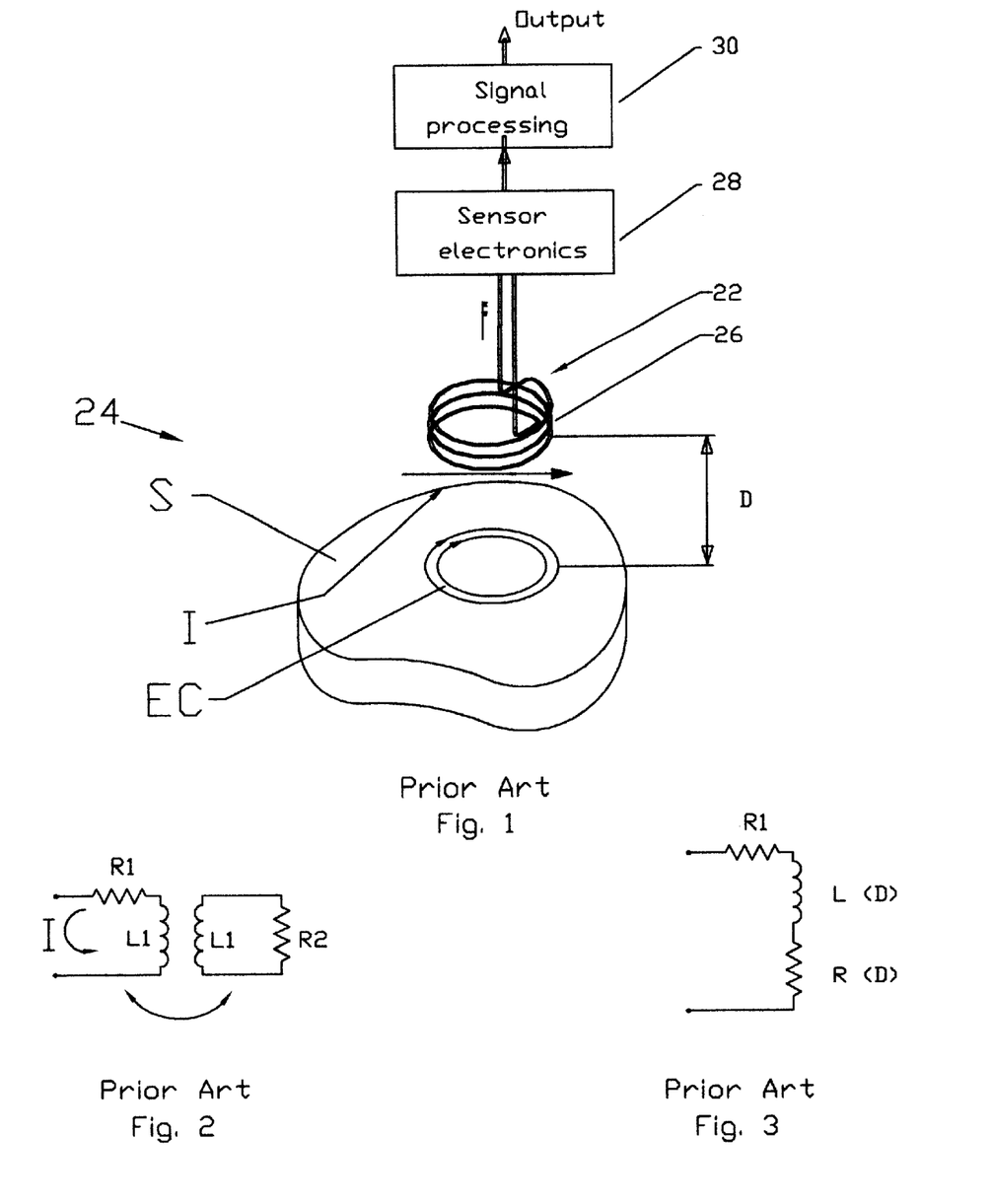
FIG. 1 is a schematic view of a known inductive sensor.
FIG. 2 is the sensor of FIG. 1 in a simplified form.
FIG. 3 is a model representation of the sensor of FIGS. 1 and 2.

FIG. 1 is a schematic view of a known inductive sensor 20 used, e.g., for positioning of an inductive sensor 22 relative to the surface S of an object 24. Let us assume that the surface S of the object 24 is conductive. The inductive sensor comprises an electromagnetic coil 26 connected to an electronic unit 28, which, in turn, is connected to a signal processing unit 30. The latter can be connected, e.g., to a computer (not shown). The electronic unit 28 may contain a signal oscillator (not shown) which induces in the electromagnetic coil 26 alternating current with a frequency within the range from several kHz to several hundred MHz.

In a simplified form the sensor of FIG. 1 can be represented by a model shown in FIG. 2. In this model, L1 designates inductance of the electromagnetic coil 26; R1 designates resistance of the coil 26; L2 designates inductance of the aforementioned virtual coil turn; and R2 is electrical resistance of the aforementioned virtual coil turn. M designates mutual induction between L1 and L2.

It can be seen from the model of FIG. 2 that the amplitude of current I generated in coil 26 will depend on R1, L12, L2, R2 and M. It is also understood that in this influence M is the most important parameter since it directly depends on a distance from the inductive sensor 22 to the surface S.

FIG. 3 is further simplification of the model of FIG. 2. Parameters L and R are functions that can be expressed in terms of L1, L2, M, R1, and R2. Therefore, as shown in FIG. 3, these parameters can be considered as functions L(D) and R(D).

The model of FIG. 3 can also be characterized by a quality factor Q, which is directly proportional to the frequency of the current in the sensor coil 26, to inductance of the sensor of FIG. 3, and is inversely proportional to a distance D (FIG. 2) from the sensor coil 26 to the surface S. The higher is the value of Q, the higher is stability of the measurement system and the higher is the measuring accuracy. Thus it is clear that in order to achieve a higher value of Q, it is necessary to operate on higher frequencies of the alternating currents in the inductance coil 26. Analysis of relationships between Q, L, and R for a fixed distance D was made by S. Roach in article "Designing and Building an Eddy Current Position Sensor" at http://www.sensormag.com/articles/0998/edd0998/main.shtml. S. Roach introduces an important parameter, i.e., a ratio of D to the diameter of the sensor coil 26, and shows that R does not practically depend on the above ratio, while the increase of this parameter leads to the growth in L and Q. When distance D becomes equal approximately to the diameter of the coil 26, all three parameters, i.e., L, Q, and R are stabilized, i.e., further increase in the distance practically does not change these parameters. In his important work, S. Roach generalized the relationships between the aforementioned parameters and showed that, irrespective of actual dimensions of the sensor, "the rapid loss of sensitivity with distance strictly limits the range of eddy current sensor to about ½ the coil diameter and constitutes the most important limitation of this type of sensing".

The impedance of the coil also depends on such factors as film thickness, flatness of the film, transverse dimensions, temperature of the film and coil, coil geometry and DC resistance, operating frequency, magnetic and electric properties of the film, etc.

As far as the operating frequency of the inductive coil is concerned, the sensor possesses a self-resonance frequency, which is generated by an oscillating circuit formed by the power-supply cable and the capacitor. As has been shown by S. Roach, in order to improve sensitivity, it is recommended to increase the quality factor Q and hence the frequency. However, the sensor must operate on frequencies at least a factor of three below the self-resonant frequency. Thus, practical frequency values for air core coils typically lie between 10 kHz and 10 MHz.

The depth of penetration of the electromagnetic field into the conductive film is also important for understanding the principle of operation of an inductive sensor. It is known that when an alternating electromagnetic field propagates from non-conductive medium into a conductive medium, it is dampened according to an exponential law. For the case of propagation through the flat interface, electric and magnetic components of the alternating electromagnetic field can be expressed by the following formulae:

$$E = E_0 \exp(-\alpha x)$$

$$H = H_0 \exp(-\alpha x),$$

where $\alpha = (\pi f \mu \sigma)^{1/2}$, f is oscillation frequency of the electromagnetic field, $\sigma$ is conductivity of the medium, and $\mu = \mu_0 = 1.26 \times 10^{-6}$ H/m (for non-magnetic materials).

Distance x from the interface, which is equal to $$x = \delta 1/\alpha = 1/(\pi f \mu \sigma)^{1/2} \qquad (1)$$

and at which the amplitude of the electromagnetic wave decreases by e times, is called the depth of penetration or a skin layer thickness. Based on formula (1), for copper on frequency of 10 kHz the skin depth $\delta$ is equal approximately to 650 $\mu$m, on frequency of 100 kHz to 200 $\mu$m, on frequency of 1 MHz to 65 $\mu$m, and on frequency of 10 MHz to 20 $\mu$m.

The above values show that for the films used in the semiconductor industry, which are typically with the thickness on the order of 1 $\mu$m or thinner, the electromagnetic field can be considered practically as uniform. This is because on any frequency in the range from 10 KHz to 10 MHz the electromagnetic waves begin to dampen on much greater depth than the thickness of the aforementioned films. Similar trend is observed in the films made from other metals, where the skin layer is even thicker because of lower conductivity. At the same time, deviations from uniformity in the thickness of the conductive coating films used in the semiconductor industry, e.g., copper or aluminum layers on the surface of silicon substrates, should not exceed 5%, and in some cases 2% of the average thickness of the layer. In other words, the deviations should be measured in hundreds of Angstroms. It is understood that conventional inductive sensors of the types described above and used in a conventional manner are inapplicable for the solution of the above problem. Furthermore, in order to match conditions of semiconductor production, such sensors must have miniature constructions in order to be installed in close proximity to the measurement site. The distance between the measurement element of the inductive sensor and the surface of the film being measured also becomes a critical issue. Due to high sensitivity, the sensor becomes very sensitive to the influence of the environment, especially, mechanical vibrations, variations in temperature, etc.

The applicants are not aware of any existing inductive sensors capable of solving the above problems.

OBJECTS OF THE INVENTION

It is an object of the invention to provide an apparatus and method for measuring thickness and thickness fluctuation in conductive coatings with sensitivity as high as several hundred Angstroms. Another object is to provide the aforementioned apparatus which has a miniature construction, can be installed in closed proximity to the surface of the film being measured, is sensitive even to minute variations in the film thickness and makes it possible to record the aforementioned variations while performing relative movements between the sensor and the object. Another object is to provide the apparatus of the aforementioned type suitable for mapping distribution of thickness variation over the surface of the coated object. A further object of the invention is to provide the apparatus of the aforementioned type in which a proximity sensor that measures the distance from the inductive sensor to the object is embodied as an integrated circuit. Still another object is to provide the apparatus of the aforementioned type which is built into a spinstand for testing hard disks/magnetic heads as an integral unit for measuring thickness of final coating layers such as carbon layers, or layers of SiC, GaAs, etc.

SUMMARY OF THE INVENTION

The invention relates to an apparatus for measuring thickness and deviations from the thickness of thin conductive coatings on various substrates, e.g., metal coating films in semiconductor wafer or hard drive disks. The films may have a thickness as small as fractions of microns. The apparatus consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer or a fiber-optic proximity sensor, which is rigidly connected to the inductive sensor. According to another embodiment, the distance is controlled with the use of a capacitance sensor, which is also rigidly connected to the inductive sensor. To achieve a certain level of accuracy during environment temperature variations, it is recommended to provide the proximity sensor with a thermocouple for temperature control.

DETAILED DESCRIPTION OF THE INVENTION

Figure 4:
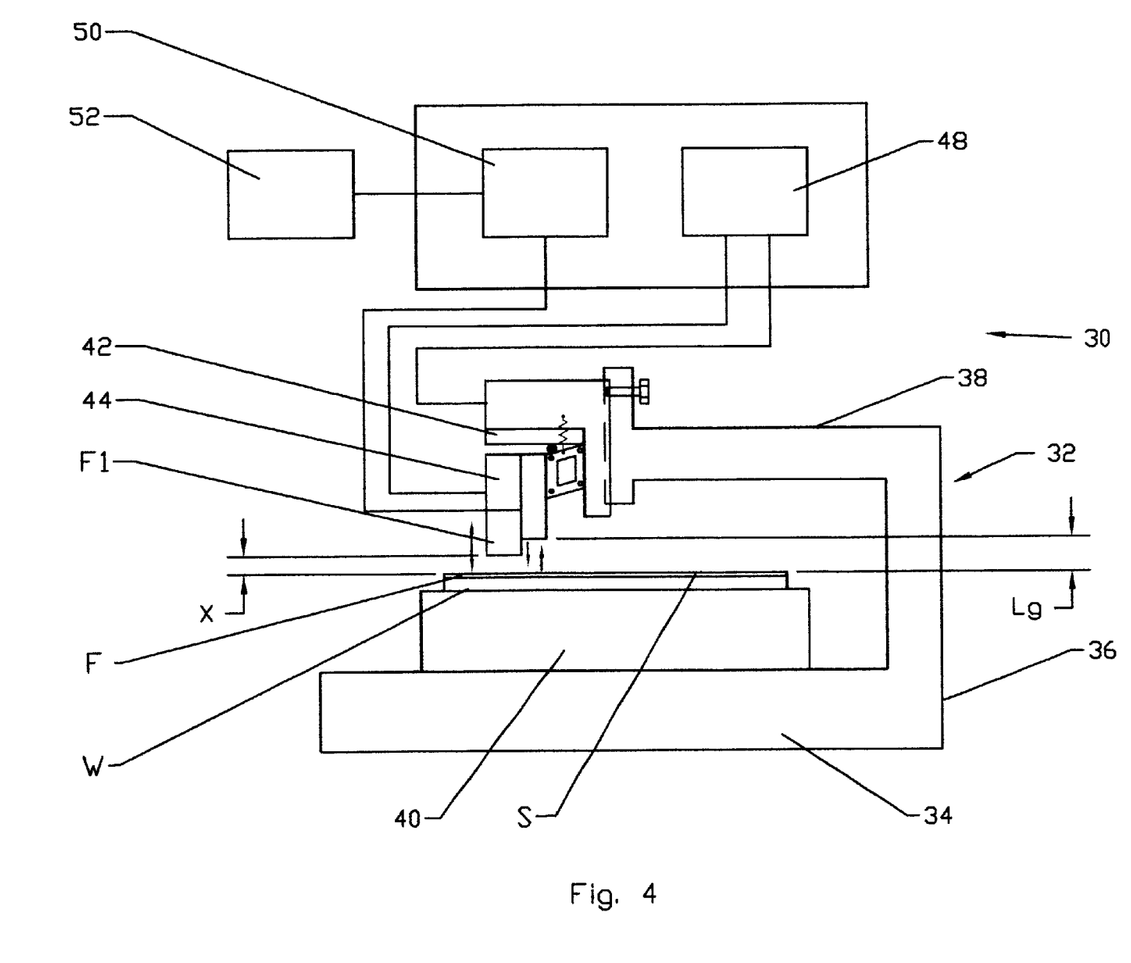
FIG. 4 is a schematic side view of the mechanical part of the apparatus of the invention with optical control of the distance.

FIG. 4—General Arrangement of the Embodiment with Optical Measurement of the Displacement For the simplicity of description and for ease of understanding, the apparatus of the invention will be first described in general in a very simplified form, and then individual units of the apparatus will be described in more detail. FIG. 4 is a simplified schematic side view of the mechanical part of the apparatus of the invention with optical control of the distance. The apparatus, which in general is designated with reference numeral 30, has a rigid C-shaped frame 32 that consists of a base plate 34, a column 36, and a rigid hangover cantilever portion 38. The base plate 36 supports a sample table 40 for securing a sample to be measured, e.g., a semiconductor wafer W coated with a conductive film F the thickness of which is an object of measurement. The sample table 40 may have a two-coordinate drive and may comprise a standard device such as Mod. MS-4M-F-50 Mod. table produced by Newport Co., CA, USA. The same table 40 may be equipped with a vacuum chuck for flattening thin objects during measurement.

Attached to the vertical surface of the hangover portion 38 is a piezo-actuator 42, which may be a standard device, e.g., piezo-actuator Mod. 17PA2015 produced by Melles Griot Co. CA, USA. With the supply of a variable voltage signal to the piezo actuator 42, the latter changes its dimensions in proportion to the voltage signal. The piezo actuator 42 has rather quick response characteristics (up to several tens of kHz). Attached to the side of the piezo actuator 42, which faces the sample W, are a micro-interferometer 46 and an inductive sensor 44. The micro-interferometer 46 is an optical device, which is sensitive to microdisplacements. Some models of microinterferometers may detect displacements as small as 200 Angstroms. An optical interferometer is an optical instrument, which is based on the phenomenon of interference of electromagnetic waves. The inductive sensor 44 may be a conventional inductive sensor of the type described with reference to FIGS. 1–3 and may comprise a flat spiral coil having a 1.5 to 3 mm outer diameter with about 50 turns. The coil can be formed on a PC board (not shown). The inductive sensor may comprise a standard device, e.g., a sensor of EX-501 type produced by Keyence Corporation of America, NJ., USA.

One indispensable requirement for realization of the apparatus 30 of the invention is stability of distance X (FIG. 4) between the end face F1 of the inductive sensor 44 and the surface S of the film F. As will be explained below in connection with operation of the apparatus 30, the very principle of the invention is based on maintaining the distance X constant. Since the micro-interferometer 46 and the inductive sensor 44 both are rigidly connected to the piezo actuator 42, the distance L between the micro-interferometer 46 and the surface S of the film F also must be maintained constant.

The device that maintains the distances X and L constant is the aforementioned piezo-actuator 42, which is controlled by an electronic unit 48 shown in the form of a block in FIG. 4. Reference numeral 50 designates another electronic unit, which contains an oscillator for the inductive sensor 44 and measures the current in the coil of the inductive sensor 44. Variations in this current are proportional to variations in the thickness of the conductive coating film F. Reference numeral 52 designates a data processing and analyzing unit, e.g., a computer, which receives information from the electronic unit 50.

In order to compensate for temperature variations which may be essential for high-accuracy measurements, the inductive sensor can be equipped with a thermocouple 45.

Some units and parts of the apparatus of FIG. 4 will be further considered in more detail.

Figure 5:
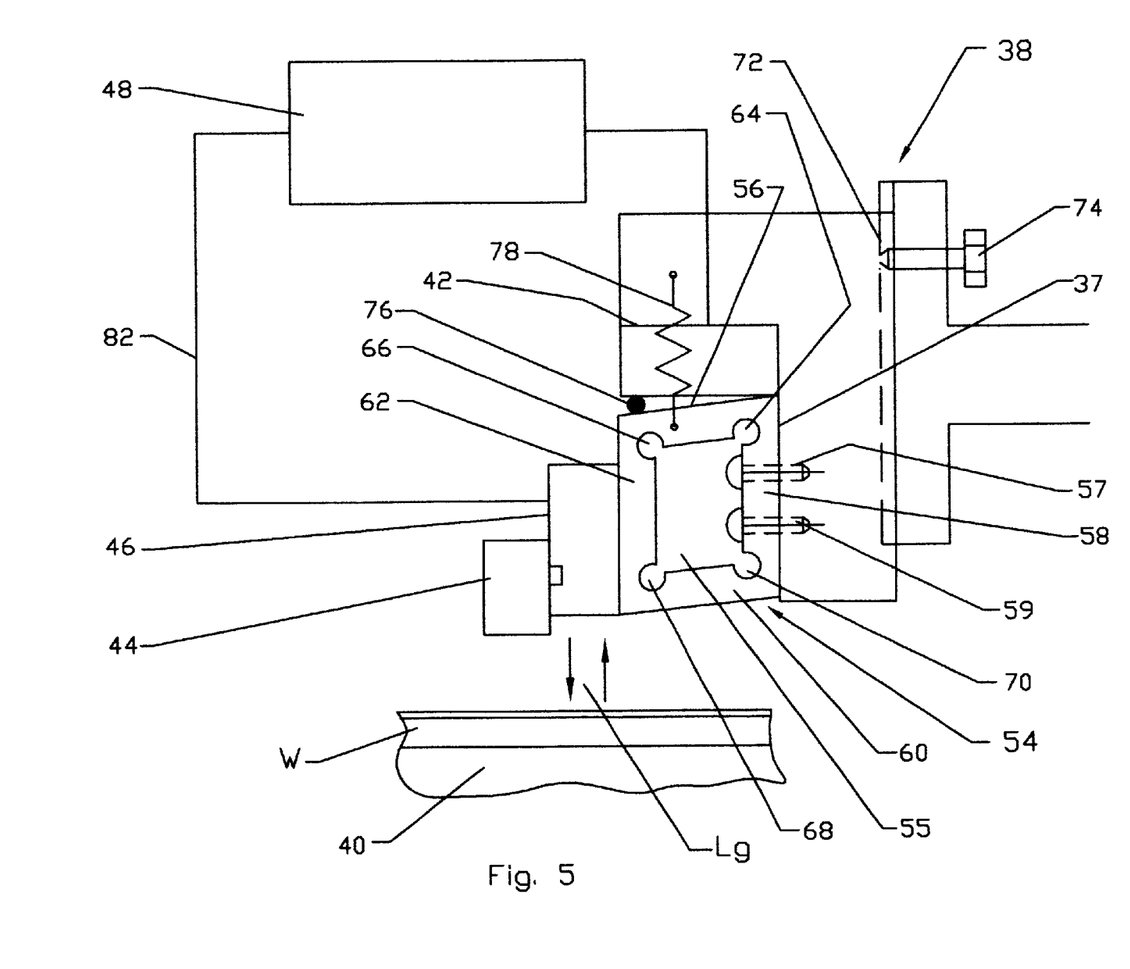
FIG. 5 is a main operating unit of the apparatus of FIG. 4.

FIG. 5—Main Operating Unit of the Apparatus of FIG. 4

A main operating unit of the apparatus 30 of the invention consists of the piezo-actuator 42, the inductive sensor 44, and the micro-interferometer 46. FIG. 4 showed the interconnection between these devices in a very schematic manner. More realistic presentation of this interconnection is given in FIG. 5. The assembly comprises a deformable body 54 in the form of a four-link parallelogram 54 made from spring steel. In the embodiment shown in FIG. 5, the parallelogram 54 comprises a monolithic rectangular body with a central rectangular-shaped opening 55. The "hinged" links 56, 58, 60, and 62 are formed by drilling holes 64, 66, 68, and 70 in the corners of the rectangular body.

One link 58 is rigidly connected, e.g., by bolts 57 and 59, to the vertical wail 37 of the hangover part 38 of the frame 30, which in FIG. 4 was shown conventionally. As a result, when the parallelogram 54 deforms under the effect of a vertical force applied from the piezo-actuator 42, the link 62 always moves parallel to the link 58 and to the aforementioned vertical wall 37.

The vertical link 62 rigidly supports the measuring optical part of the interferometer 46 (FIGS. 4 and 5) and the inductive sensor 44. L and Δx have the same meanings as defined with reference to FIG. 4. In a specific case these distances may be selected equal. Similar to FIG. 4, reference numeral W designates in FIG. 5 an object, such as a semiconductor wafer, with a coating, e.g., a conductive film F. Reference numeral 40 designates a moveable table.

For coarse movement to the operation position in a vertical direction, the assembly consisting of the parallelogram 54 with the inductive sensor 44 and the micro-interferometer can be shifted vertically in guides 72 of the frame 38 and fixed in the selected position by a screw 74.

The piezo-actuator 42 is supported by the link 56 via a body of rotation, such as roller 76 having a longitudinal axis in the direction perpendicular to the plane of the drawing of FIG. 5. The piezo-actuator 42 is constantly pressed to the link 56 by a compression spring 78, and the roller 76 is moveable in the gap 80 formed by this roller between the lower surface of the piezo-actuator and the upper surface of the link 56. Thus, the gap 80 and the taper angle of the gap are increased as the roller 76 is shifted towards the vertical surface 37. FIG. 5 also shows that the inductive sensor 44 is connected by a feeder line 82 to the electronic unit 48. The use of the roller 76 makes it possible to adjust displacements of the link 62 of the deformable parallelogram 54 so, that with the same control voltages of the piezo-actuator 64, the link 62 that supports the inductive sensor 44 and the micro-interferometer 46 can be set to different working amplitudes of movement of the link 62. In other words, the dynamic range of the link displacements i.e., a ratio of maximum displacement to the minimum one caused by the piezo-actuator 42 can be about ten.

Figure 6:
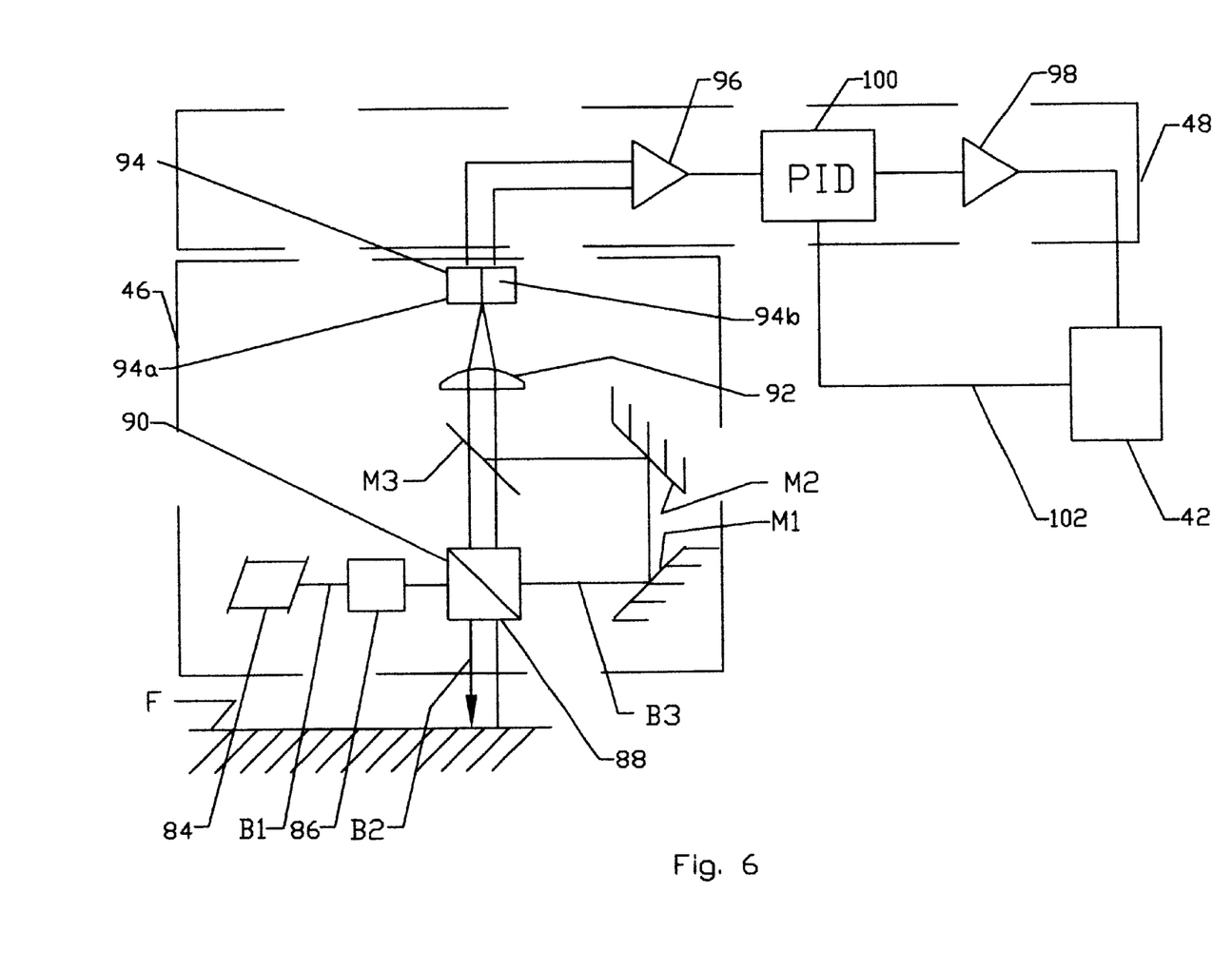
FIG. 6 is a schematic view illustrating a signal processing and control unit for the embodiment of the apparatus utilizing an optical measurement system.

FIG. 6—Signal Processing and Control Unit for Embodiment of the Apparatus Utilizing an Optical Measurement System FIG. 6 is a more detailed view of the electronic unit 48 together with micro-interferometer 46. The electronic unit 48 processes optical signals obtained from the micro-interferometer 46 and controls operation of the piezo-actuator so as to maintain distances L and X constant. The unit 48 comprises a light source, e.g., a laser light source 84, which generates a laser beam B1 sent via a beam collimator 86 to a beam splitter 88. The latter divides beam B1 into a measurement beam B2, which is reflected from the beam-splitting surface 90 of the beam splitter 88 and is directed towards the measured film F, and the reference beam B3 which passes through the beam-splitting surface 90 toward a reflective mirror M1. The beam B3 is then sent to a reflective mirror M2 and is directed therefrom to a semi-transparent mirror M3. The interferometric part of the device also contains an objective 92 and a double-based or dual photo-diode 94 located on the optical path of the beam B3 reflected from the semitransparent mirror M3.

The output of the photo-diode 94 is electrically connected to a differential amplifier 96 and with another amplifier 98 via a proportional integral derivation regulator (PID) 100. The PID regulator is a process controller that monitors the analog input process variable, compares the input of the desired set point, and calculates the analog output control variable based on the control algorithm programmed by the regulator. The output of the amplifier 98 is connected to the piezo-actuator 42 (FIGS. 4, 5, and 6). In FIG. 6, the piezo-actuator 42 is shown in the form of a box, and rigid connection between the piezo-actuator and the micro-interferometer 46 is shown by a solid line 102.

Figure 7:
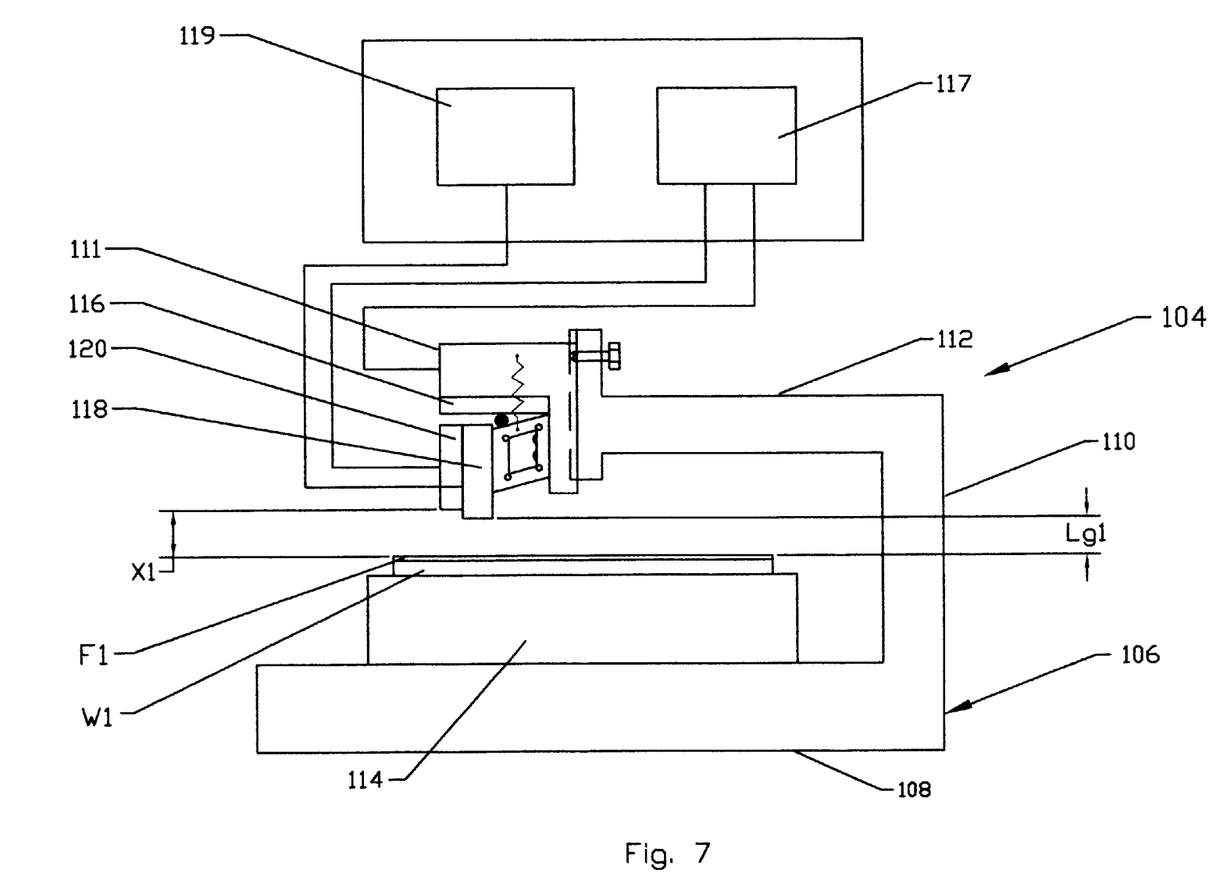
FIG. 7 is a schematic view illustrating general arrangement of the embodiment with electrical measurement of the displacement.

FIG. 7—General Arrangement of the Embodiment with Electrical Measurement of the Displacement FIG. 7 is a simplified schematic side view of the mechanical part of the apparatus of the invention with electrical control of the distance. In fact, the arrangement of the embodiment of FIG. 7 is similar to the one for the embodiment of FIG. 4 and differs from it in that variations in distances Lg1 and X1 are measured with the use of a capacitive sensor instead of the microinterferometer. The apparatus of this embodiment, which in general is designated with reference numeral 104, has a rigid C-shaped frame 106 that consists of a base plate 108, a column 110, and a rigid hangover cantilever portion 112. The base plate 108 supports a sample table 114 for securing a sample to be measured, e.g., a semiconductor wafer W1 coated with a conductive film F1, the thickness of which is an object of measurement. The sample table 114 may have a two-coordinate drive and may comprise a standard device such as Newport table Mod 4M-F-50 produced by Newport Co., CA, USA.

Attached to the vertical surface 111 of the hangover portion 112 is a piezo actuator 116, which may be a standard device of the type 17PAZ015 produced by Melles Griot. With the supply of a variable voltage signal to the piezo actuator 116, the latter changes its dimensions in proportion of the voltage signal. The piezo actuator 116 has rather quick response characteristics (up to several tens of kHz). Attached to the side of the piezo actuator 116, which faces the sample W1, are a capacitive sensor 118 and an inductive sensor 120. The capacitive sensor 118, which is known also as a dilatometer, is a device having a sensitive element in the form of a capacitor plates included into an electrical oscillation circuit. If the aforementioned capacitor plates are located in close proximity to the conductive film F1, variations in the magnitude of distance X1 will change the resonance frequency of the sensor 118 approximately in a square-root relationship with the aforementioned distance variation.

The device that maintains the distances X1 and L1 constant is the aforementioned piezo-actuator 116, which is controlled by an electronic unit 117 shown in the form of a block in FIG. 7. Reference numeral 119 designates another electronic unit, which contains an oscillator for the inductive sensor 120 and measures the current in the coil of the inductive sensor 120.

Figure 8A:
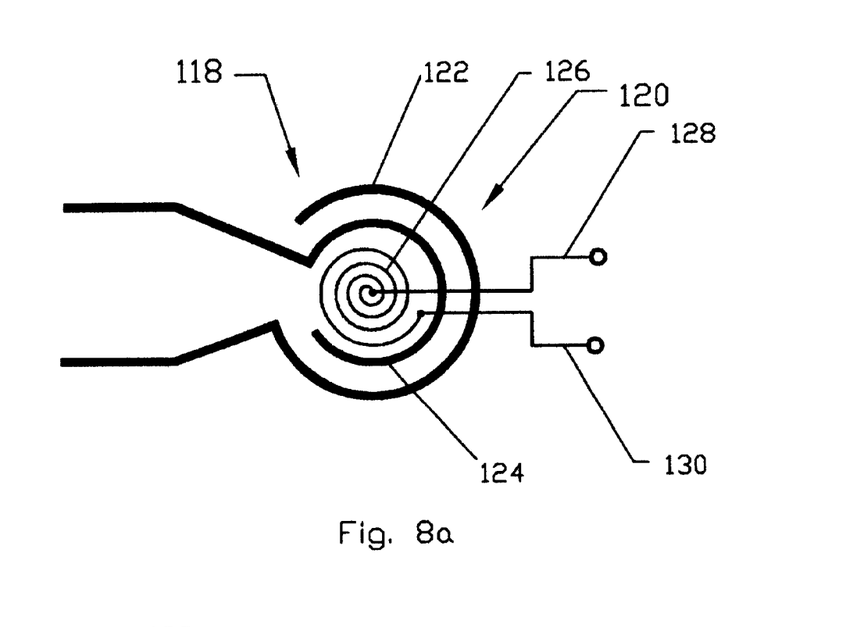
FIG. 8A is a view illustrating an example of a PC board mounting a combination of both a capacitive sensor and an inductive sensor.
Figure 8B:
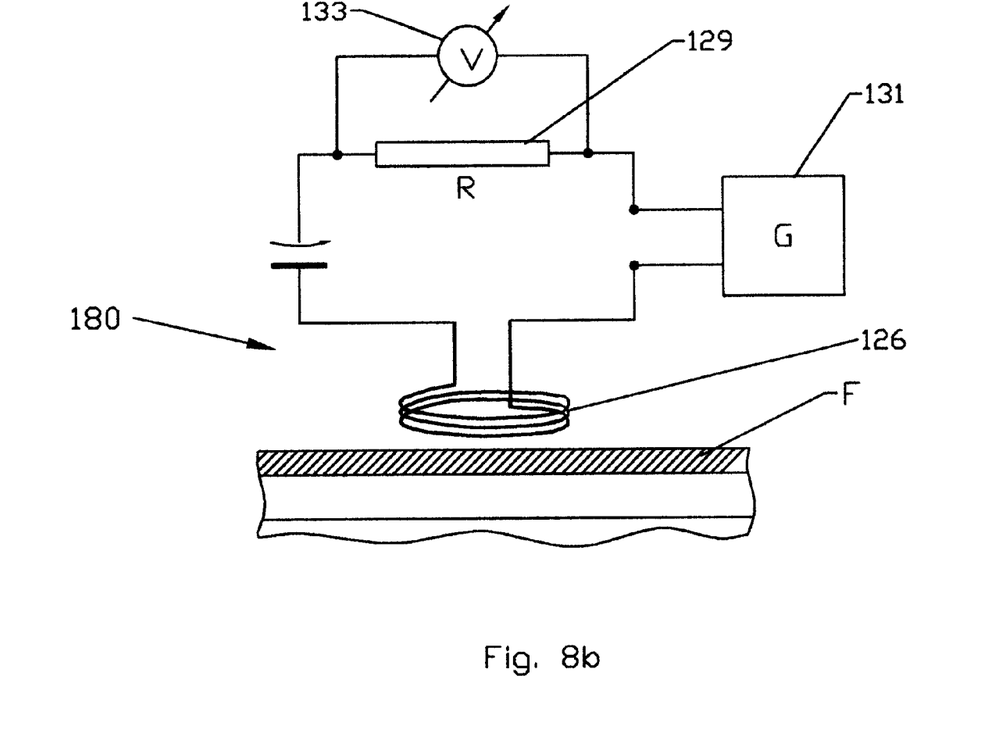
FIG. 8B is an electric circuit of the film thickness measurement system that incorporates the inductive sensor.

Some models of dilatometers (which operate in a microwave frequency range and are equipped with special compensators of environment fluctuations) may detect displacements as small as tens of Angstroms. General-purpose dilatometers have sensitivity of several hundreds of Angstroms. An example of such a sensor is shown in FIG. 8A, which is a simplified schematic view of the sensor. The capacitive sensor 118 has a pair of circular capacitor plates 122 and 124 which are spaced from each other and surround a spiral inductive coil 126 of the inductive sensor 120 (FIGS. 7 and 8A) located in the center of the internal capacitor plate 126. The entire capacitive sensor 118, including the inductive coil 126 of the inductive sensor 120, can be formed on a PC board and may have overall dimensions not exceeding several millimeters. Miniature dimensions of the capacitive sensor 118 and the inductive sensor 120 are important for localization of measurements. Terminals 128 and 130 are output terminals of the inductive coil 126. Thus, it is understood that though in FIG. 7 the inductive sensor 120 and the capacitive sensor 118 are shown as separate units, they can be combined into one small assembly of the type shown in FIG. 8A. An electric circuit of the film thickness measurement system that incorporates the inductive sensor 120 is shown in FIG. 8B. As can be seen from FIG. 8B, the coil 126 is maintained at constant distance X from the surface S of the coating film F. The coil 126 is connected in series with a capacitor 127, a measurement resistor 129, and an high-frequency current generator 131 to form an electric oscillating circuit operating on the frequency of the aforementioned generator 131. A measurement instrument, such as an analog or digital voltmeter 133, is connected in parallel to the measurement resistor 129.

Figure 9:
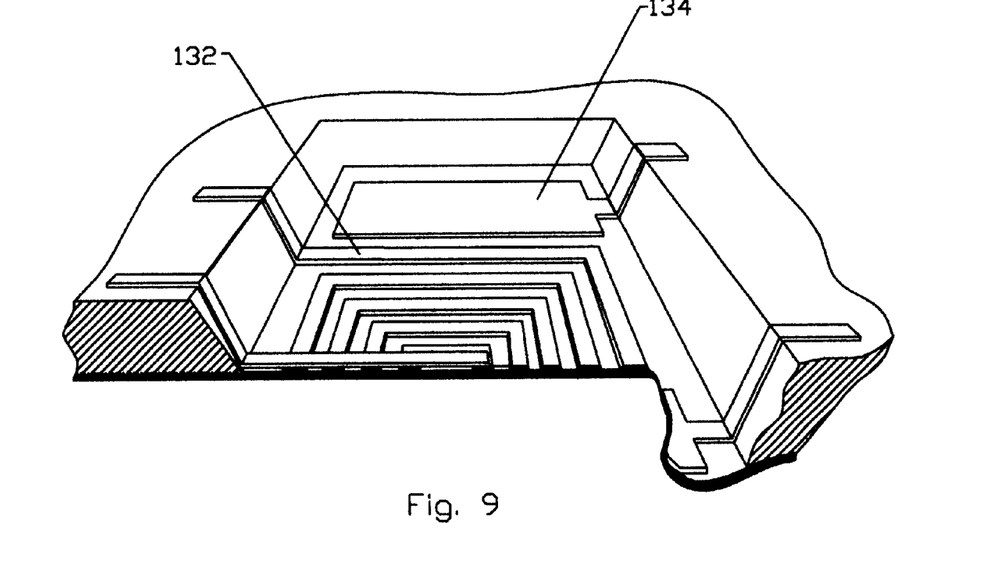
FIG. 9 is a fragmental three-dimension view of an integrated-circuit microchip that contains an inductive sensor and a capacitive sensor.

If necessary, the unit that consists of the inductive sensor 120 and the capacitive sensor 118 can be formed as an integrated-circuit microchip, e.g., on a silicon substrate. Such an arrangement is shown in a three-dimensional view of FIG. 9, where 132 is an inductive sensor, and 134 designates a capacitive sensor. This combined integrated sensor is manufactured in accordance with MEM's (Micro-Electro-Mechanical) technique by etching silicon coated, e.g., with a $Si_3N_4/SiO_2/Si_3N_4$ stack with a metallic planar coil and capacitor. The aforementioned coil and capacitor are formed by photolithography. In FIG. 9, reference numeral 135 designates contacts of the inductive coil, and reference numeral 137 designates contacts of the capacitor.

If necessary, the inductive sensor 120 may be installed separately and comprise, as in the embodiment of FIG. 5, a conventional inductive sensor, e.g., a sensor of EX-501 type produced by Keyence Corporation of America, NJ., USA.

The piezo-actuator 116 of the embodiment of FIG. 7 may be the same as the one described in connection with the optical embodiment of FIG. 4 and may incorporate the same parallelogram arrangement as shown in FIG. 5. Therefore the description of mechanisms used for attachment of the piezo-actuator 116 is omitted.

Figure 10:
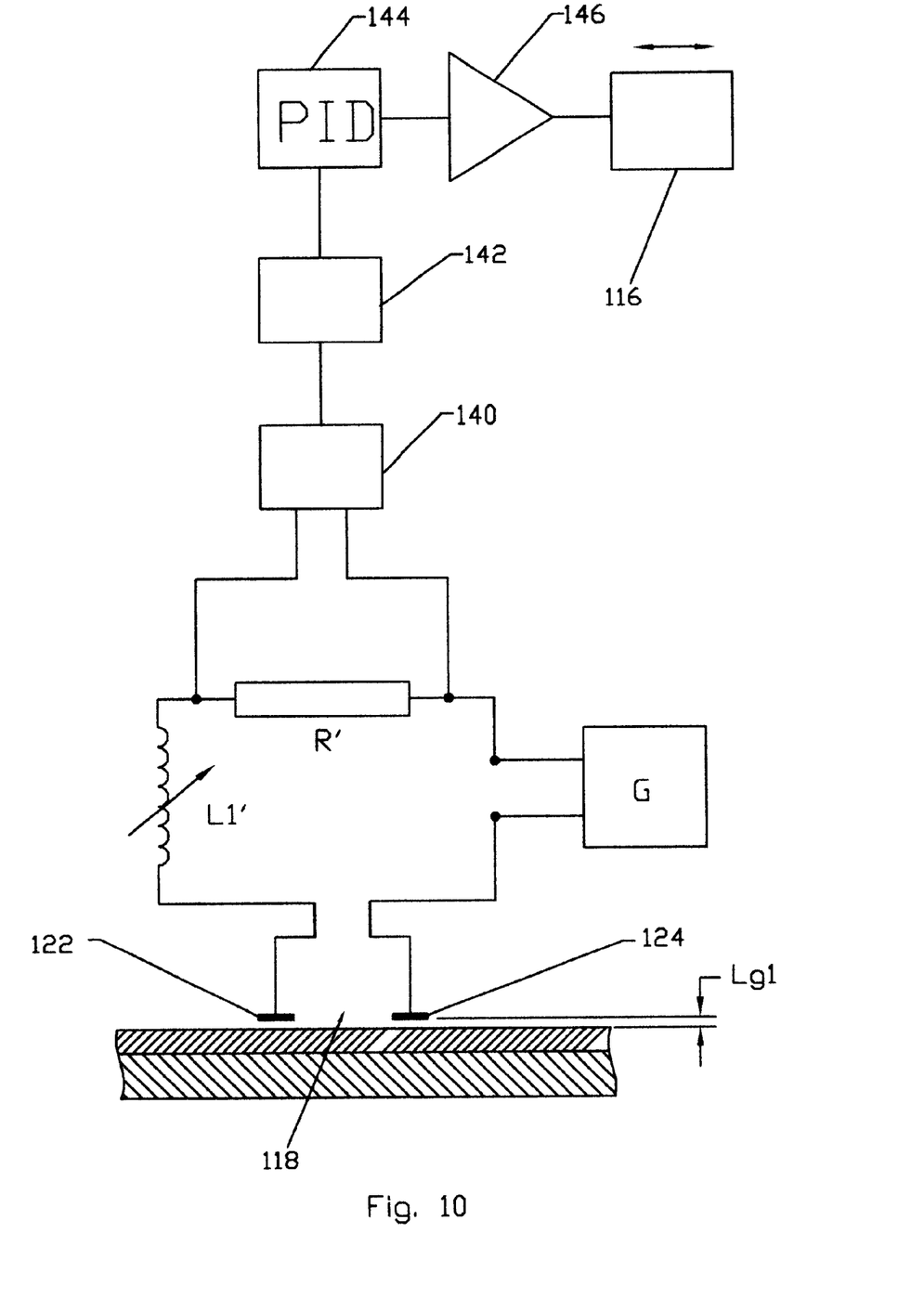
FIG. 10 is a schematic view of a signal processing and control circuit for the embodiment of the invention with the use of a capacitive sensor for measuring variations in distance X.

FIG. 10 is a schematic view of a signal processing and control circuit for the embodiment of the invention with the use of a capacitive sensor for measuring variations in distance X. In other words, FIG. 10 shows a signal processing and control circuit for the embodiment of FIG. 7. In this drawing, reference numerals 122 and 124 designate capacitive plates of the capacitor sensor 118 which form, together with the inductance L1', a high-frequency generator 138. Reference numerals 140 and 142 designate a frequency meter and a frequency-voltage converter, respectively. The output of the frequency-voltage converter 142 is connected to the piezo-actuator 116 via a PID 144 and an amplifier 146. Resistor R is an active resistance of the measurement circuit, which is connected in series into the oscillation circuit 148.

FIGS. 4, 5, 6—Operation of the Apparatus of the Invention with Optical Measurement and Control of Distance Variations It is assumed that the inductive sensor 44 has been calibrated for operation with a predetermined material of the conductive coating and for a predetermined measurement distance X from the inductive sensor 44 to the surface of the film F. A sample W coated with a conductive film F is secured to the sample table 40, the inductive sensor 44 and the microinterferometer 46 are energies, and the point of interest of the object is axially aligned with the position of the inductive sensor 44 and the microinterferometer 46. The table 40 is adjusted vertically by moving it in the vertical slides 72 (FIG. 5) and is fixed by bolt 74 in a position, in which the object is spaced from the inductive sensor 44 at the distance X. In accordance with the invention, the inductive sensor provides the highest resolution of measurements when X in FIG. 4 (which is distance D in FIG. 1) is about half of external outer diameter of the coil. For coils of large diameters, e.g., for standard sensors of Keyence Corporation of America, this distance may be greater than have of the coil diameter.

When the laser light source 84 is activated, the laser beam B1 is sent via the beam collimator 86 to the beam splitter 88, where beam B1 is divided by the beam splitting surface 90 into the measurement beam B2, which is sent to the film F and is reflected therefrom and the reference beam B3. The measurement beam B2 reflected from the film F passes through the beam-splitting surface 90, the semitransparent mirror M2, the objective 92, and propagates to the double-based or dual photo-diode 94 located on the optical path of this beam. At the same time, the reference beam B3 passes through the beam splitting surface 90, and, after being reflected sequentially from the mirrors M1, M2 and mirror M3, it is conjugated with the optical path of the measurement beam B2, so that it also falls onto the double-based or dual photo-diode 94. Since both the measurement beam B2 and the reference beam B3 are emitted from the same light source, they have correlated phases. The phase shift is determined by difference in the length of the optical path. Thus, by changing the length of the optical path of one of the beams, it is possible to adjust the phase difference between the beams, e.g., in the focal plane of the objective 92, which is located on the receiving surface of the double-based or dual photo-diode 94.

It is understood that as a result of the events described above, a localized interference of the beams B2 and B3 will take place. The aforementioned receiving surface of the double-based or dual photo-diode 94 is divided into two areas 94a and 94b. The micro-interferometer 46 is adjusted so that one interference fringe overlaps two areas 94a and 94b simultaneously so that electric signals from the outputs of the double-based or dual photo-diode 94 are equal. When such equal signals are supplied to the input of the differential amplifier 96, the output of this amplifier is zeroed. Even a slightest variation in the distance L causes, because of variation in the phase difference of the beams B2 and B3, geometrical displacement of the fringe to one or to the other area 94a or 94b. This, in turn, causes a positive or negative voltage signal on outputs of the differential amplifier 96. This signal is processes by the PID 100 into a form matched via the amplifier 98 with control elements of the piezo-actuator 42. The latter immediately responds to the signal and shifts the link 56 (FIG. 5) of the parallelogram 54 with respect to the surface of the film F to restore the reference distance L. For the system described above, the entire process of microadjustment occurs approximately during 1 to 10 milliseconds.

The operation described above is repeated each time when distance L is changed. Although the distance stabilization system described above is capable of maintaining distance L with accuracy up to 100 Angstroms, with special modification of the interferometer and environment compensation features it is possible to reach accuracy as high as tens of Angstroms.

Thus, it is assumed that due to the use of the aforementioned optical system that stabilizes distance L, the inductive sensor 44 (FIG. 4) or 120 (FIG. 8A and FIG. 8B) always operates at a constant distance X from the film F. It is also understood that distance X is maintained constant when the sample table 40 moves from one measurement point to another. Since the inductive sensor has been calibrated for each predetermined material of the conductive film and for each predetermined thickness of this film, readings of the analog or digital voltmeter 133 will correspond to the predetermined values of the film thickness. The thicker is the coating film, the lower is electrical resistance in the conductive film, which can be considered as a virtual turn with the current induced by the coil 126. If thickness of the conductive film F changes, the amplitude of the current in the oscillating circuit formed by the coil 126, capacitor 127, resistor 129, and generator 131 also will be changed. Variation in the aforementioned amplitude expresses variations in the film thickness. Calibration of the inductive sensor for various values of the current amplitudes makes it possible to interpret readings of the voltmeter 133 directly in terms of the film thickness.

The capacitor 127 is shown as a variable capacitor that can be adjusted for optimization of a frequency ratio between the frequency of the generator and the resonance frequency of the oscillating circuit. Such an optimization is needed to provide maximum sensitivity of measurements.

By repeating measurements of the film thickness in different measurement points, it is possible to map distribution of thickness variations over the entire surface of the coated object.

FIGS. 7, 8A, 10—Operation of the Apparatus of the Invention with Electrical Measurement and Control of Distance Variations As has been mentioned above, the inductive sensor 120 (FIG. 7) has been calibrated for operation with a predetermined material of the conductive coating and for a predetermined measurement distance X from the inductive sensor 120 to the surface of the film F1.

A sample W1 coated with a conductive film F1 is secured to the sample table 114, the inductive sensor 120 and the capacitive sensor 118 are energies, and the point of interest of the object is axially aligned with the position of the inductive sensor 120 and the capacitive sensor 118. The table 114 is adjusted vertically by moving it in the vertical slides (not shown for this embodiment) and is fixed in a position, in which the object is spaced from the inductive sensor 120 at the distance X1. In accordance with the invention, the inductive sensor provides the highest resolution of measurements when X1 in FIG. 7 (which is distance D in FIG. 1) is about half of external outer diameter of the coil. For coils of large diameters, e.g., for standard sensors of Keyence Corporation of America, this distance may be greater than half of the coil diameter.

If the capacitive sensor has a construction of the type shown in FIG. 8A, i.e., the inductive sensor 120 and the capacitive sensor 118 are mounted on the same substrate, distance X1 is equal to distance Lg1', as shown in FIG. 10. When the measurement circuit shown in FIG. 10 is energized and operates at resonance conditions, the amplitude of the current in this circuit (which is formed by the inductance L1', resistor R', AC generator 138, and the capacitor 118 formed by the capacitive plates 122, 124 of the capacitive sensor 118 and the coating film F1') is stabilized and is determined by the Q factor. If the distance Lg1' changes, capacitance of the capacitor 118 also will change. As a result, resonance conditions will be violated, and the amplitude of the oscillations in the aforementioned oscillating circuit will drop.

Measurements of variations in the distance Lg1 are carried out by restoring resonance conditions by adjusting the excitation frequency of the AC generator 138, and then the difference between the restored resonance frequency and the previous one will be measured to determine the variation in the film thickness. It should be noted that variation in the resonance frequency will be proportional to the square root of variation in Lg'. The second resonance frequency is restored automatically in real time since the waveband of the excitation frequency of the AC generator 138 is sufficiently wide and the shift of the resonance frequency occurs within the boundaries of the aforementioned waveband.

The signal from the measurement resistor R' is sent to the frequency meter 140 and then to frequency-voltage converter 142 (FIG. 10). From the output of the frequency-voltage converter 142 the signal is sent to the piezo-actuator 116 via the PID 144 and the amplifier 146.

The piezo-actuator 116 and the inductive sensor 120 will operates exactly in the same manner as has been described for the embodiment of FIGS. 4, 5, 6 with the optical data processing and control of variations in the distance.

Figure 8C:
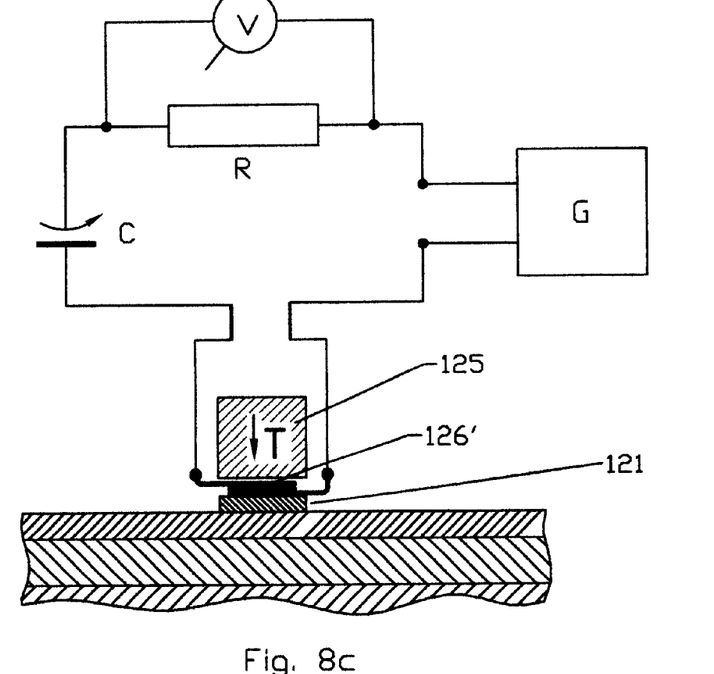
FIG. 8C is a view similar to FIG. 8B for an embodiment of the invention with the use of a precalibrated spacer for maintaining the distance between the conductive film and the inductive coil constant.

It is understood that for simplification of operation, during measurement in all aforementioned embodiments the inductive sensors 44 and 120 can be brought in contact with the surface of the conductive film F (F1) via a spacer 121 of a calibrated thickness. In this case distance X (X1) will always be constant. This measurement condition is shown in FIG. 8C which is a fragmental view of the circuit similar to the one shown in FIG. 8B. It can be seen that the inductive coil 126' is in contact with the spacer 121 which is placed onto the conductive film F2. The coil 126' is pressed to the spacer 121 with a predetermined force T by means of a load 125.

Such an application makes the use of the distance stabilization mechanisms, i.e., the microinterferometer 46 and the capacitive sensor 118 unnecessary. However, all the advantages of the non-contact measurement will be lost. Furthermore, contact measurements will require the use of special means for stabilization of contact pressure.

Figure 11:
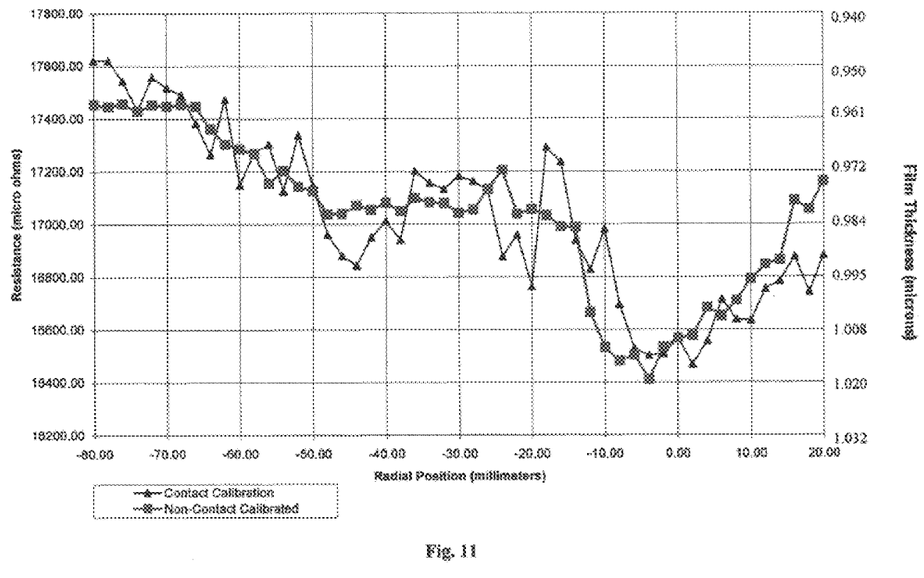
FIG. 11 is an example of actual measurements of a thickness of a copper film on a semiconductor wafer by apparatus of the invention; for comparison, the same drawing contain results of measurements by a four-point probe method.

FIG. 11 is an example of actual measurements of a thickness of a copper film on a semiconductor wafer by apparatus of the invention. For comparison, the same drawing shows results of measurements by a four-point probe method. The curve I corresponds to the results obtained with the apparatus of the invention, and the curve 11 corresponds to the results obtained by the four-point probe contact method. It can be seen that both results are well correlated and that the curve obtained by the apparatus of the invention is characterized by a significant decrease in scattering of measurement data.

Thus it has been shown that the invention provides an apparatus and method for measuring thickness and thickness fluctuations in conductive coatings with sensitivity as high as several hundred Angstroms. The aforementioned apparatus has a miniature construction, can be installed in closed proximity to the surface of the film being measured, is sensitive even to minute variations in the film thickness and makes it possible to record the aforementioned variations while performing relative movements between the sensor and the object. The apparatus is suitable for mapping distribution of thickness variation over the surface of the coated object. The proximity sensor that measures the distance from the inductive sensor to the object can be embodied as an integrated circuit.

The device of the invention can be built into a spinstand for testing hard disks/magnetic heads as an integral unit for measuring thickness of final coating layers such as carbon layers.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the distance between the surface of the film and the inductive sensor can be stabilized with the use of an atomic force microscope, by measuring frequency with the use of a special capacitive sensor that operates on a microwave frequency, or by utilizing an optical-fiber proximity sensor.

What we claim is:

1. An apparatus for measuring thickness and deviations from thickness of a thin conductive film on a substrate, comprising:

a rigid frame;

support means movably attached to said rigid frame;

inductive means rigidly connected to said support means, said inductive means being capable of generating an inductive current in said thin conductive film when located at a distance from said conductive film sufficient for generating said inductive current, said inductive means being precalibrated with respect to a material and thickness of said coating film for predetermined values of said distance so that by measuring electrical characteristics of said inductive means it is possible to match said electrical characteristics with the thickness of said conductive film; and distance stabilization means rigidly connected to said support means and hence to said inductive means, said distance stabilization means being intended for maintaining said predetermined values of said distance constant during measurement of said thickness, said distance stabilization means having an actuating mechanism for moving said support means together with said distance stabilization means and said inductive means with respect to said conductive film;

said inductive means comprising an oscillating electric circuit formed by an inductive coil, a capacitor, means for measuring said electrical characteristics, and an alternating current generator;

said distance stabilization means comprising an electronic unit and an optical measurement means;

said optical measurement unit comprising a microinterferometer for optically measuring deviations of said distance from said predetermined distance and for generating an optical signal;

said electronic unit having means for processing said optical signal, means for converting said optical signal into an electrical signal, and means for sending said electrical signal to said actuating mechanism, said electronic unit comprising a double-based photodiode, a differential amplifier connected to said double-based photo-diode, a proportional integral derivation regulator connected to said differential amplifier, and an amplifier connected to said proportional integral derivation regulator and to said actuating mechanism.

2. The apparatus of claim 1, wherein said means for converting said optical signal into an electrical signal is a proportional integral derivation regulator.

3. The apparatus of claim 1, wherein said actuating means is a piezo-actuator and wherein said support means comprises a deformable parallelogram having one link connected to said actuating mechanism, one link connected to said rigid frame, and one link supporting said inductive means and said distance stabilization means so that movements of said actuating mechanism are transmitted to said one link supporting said inductive means and said distance stabilization means.

4. The apparatus of claim 1, wherein said distance stabilization means comprise a capacitive distance stabilization means comprising an oscillating electric circuit that contains a capacitor sensor, an inductance, a frequency measurement means for measuring frequency of oscillations in said oscillating electric circuit, and an AC generator; said support means comprising a deformable parallelogram having one link connected to said actuating mechanism, one link connected to said rigid frame, and one link supporting said inductive means and said distance stabilization means so that movements of said actuating mechanism are transmitted to said one link supporting said inductive means and said distance stabilization means.

5. The apparatus of claim 3, further comprising means for adjusting dynamic range of displacements of said one link that supports said inductive means and said distance stabilization means without changing operation conditions of said actuating means.

6. The apparatus of claim 5, wherein said actuating means is a piezo-actuator.

7. The apparatus of claim 6, wherein said means for adjusting dynamic range comprises a body of rotation placed between said actuating mechanism and said one link connected to said actuating mechanism.

8. The apparatus of claim 4, further comprising means for adjusting dynamic range of displacements of said one link that supports said inductive means and said distance stabilization means without changing operation conditions of said actuating means.

9. The apparatus of claim 8 wherein said actuating means is a piezo-actuator.

10. The apparatus of claim 4, wherein said means for adjusting dynamic range comprises a body of rotation placed between said actuating mechanism and said one link connected to said actuating mechanism.

11. The apparatus of claim 1, further comprising means for maintaining said predetermined distance constant in each point of measurement and means for pressing said inductive means to said conductive film with a constant pressure.

12. The apparatus of claim 11, wherein said means for maintaining said predetermined distance constant comprises a spacer of a predetermined thickness through which said inductive means are brought in contact with said conductive film, and wherein said means for pressing comprises a constant load.

13. The apparatus of claim 1, wherein said apparatus is capable of measuring said thickness of said conductive film as small as 100 Angstroms and deviations from said thickness as small as tens of Angstroms.

14. A method of measuring a thickness and deviations from thickness of thin conductive films comprising the steps of:
providing an apparatus comprising:
inductive means rigidly connected to said support means, said inductive means being capable of generating an inductive current in said thin conductive film when located at a distance from said conductive film sufficient for generating said inductive current, said inductive means being precalibrated for obtaining precalibrated electrical values with respect to a material and thickness of said coating film for predetermined values of said distance so that by measuring electrical characteristics of said inductive means it is possible to match said electrical characteristics with the thickness of said conductive film;
means for maintaining said distance constant during measurement; and
pressure means for pressing said means for maintaining said distance constant to said conductive film with a constant pressure;
bringing said inductive means in contact with said conductive film via said positioning said inductive means at said distance that corresponds to the material and thickness of said coating film by using said means for maintaining said distance constant and said pressure means;
measuring said electrical characteristics; and
determining said thickness and deviations from said thickness by comparing said electric characteristics with said precalibrated electrical values;
said means for maintaining said predetermined distance constant comprise a spacer of a predetermined thickness and wherein said pressing means comprise a constant load.

* * * * *